Sept. 27, 1966  J. J. DOLFI, SR  3,274,984
AUTOMATIC VACUUM SPOILER FOR INTERNAL COMBUSTION ENGINES
Filed May 17, 1963
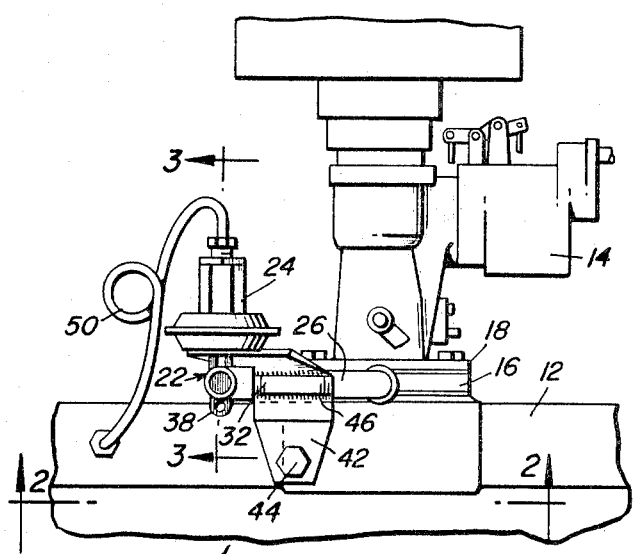
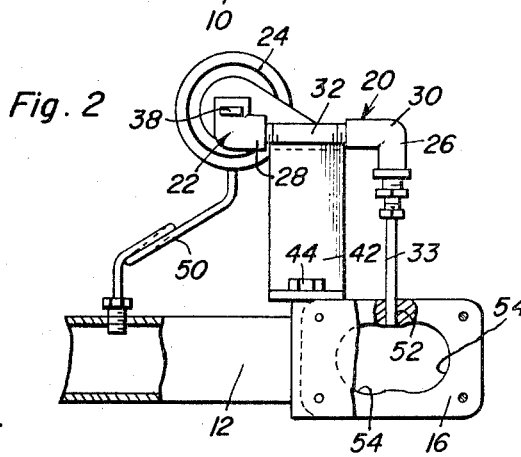
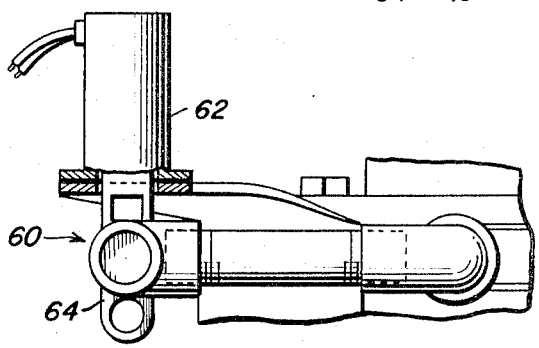
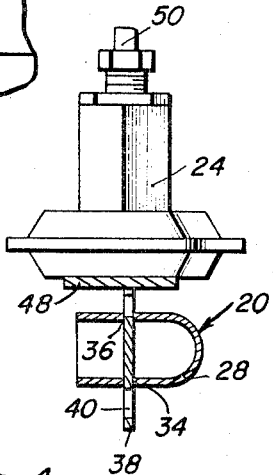
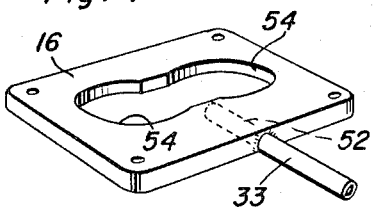
James J. Dolfi, Sr.
INVENTOR.

United States Patent Office 3,274,984
Patented Sept. 27, 1966

3,274,984
AUTOMATIC VACUUM SPOILER FOR INTERNAL COMBUSTION ENGINES
James J. Dolfi, Sr., P.O. Box 434, Torrance, Calif.
Filed May 17, 1963, Ser. No. 281,119
1 Claim. (Cl. 123—124)

This invention relates to a novel and useful automatic vacuum spoiler for internal combustion engines and more specifically to an apparatus designed specifically for the purpose of reducing the vacuum in an intake manifold of an internal combustion engine and thereby reducing the amount of liquid fuel drawn into the intake manifold.

The automatic vacuum spoiler assembly of the instant invention includes an adapter plate which is adapted to be interposed between the intake manifold and the mounting flange of a carburetor supported from the manifold and the adapter plate is apertured in a manner to conform to the passages formed in the base of the carburetor. The adapter plate includes a bore having one end communicated with the apertures formed in the plate and the other end opening outwardly of the plate and adapted to be communicated with the air valve of the vacuum spoiler assembly. The air valve of the vacuum spoiler assembly is utilized to admit air from the ambient atmosphere into the bore formed in the adapter plate and thus into the intake manifold of the internal combustion engine and includes an actuator operatively connected to the internal combustion engine for actuation to open the air valve in direct response to given engine operating conditions.

The main object of this invention is to provide an automatic vacuum spoiler assembly for an internal combustion engine which will be capable of admitting air into the intake manifold of an internal combustion engine in response to various operating conditions of the internal combustion engine.

A further object of this invention, in accordance with the immediately preceding object, is to provide a vacuum spoiler assembly capable of being actuated in direct response to an increase of vacuum within the intake manifold beyond a predetermined point.

Still another object of this invention is to provide an automatic vacuum spoiler for the intake manifold of an internal combustion engine which is operative in response to engine speed to admit air into the intake manifold of the internal combustion engine whenever the speed of operation of the engine exceeds a predetermined level.

A final object of this invention to be specifically enumerated herein is to provide an automatic vacuum spoiler assembly in accordance with the preceding objects which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a conventional form of internal combustion engine provided with a downdraft carburetor and with the adapter plate of the instant invention interposed between the mounting flange of the carburetor and the intake manifold of the internal combustion engine;

FIGURE 2 is a fragmentary bottom plan view taken substantially upon the plane indicated by the section line 2—2 of FIGURE 1 and with parts of the internal combustion engine and adapter plate being broken away and shown in section;

FIGURE 3 is an enlarged fragmentary vertical sectional view taken substantially upon the plane indicated by the section line 3—3 of FIGURE 1;

FIGURE 4 is a perspective view of the adapter plate of the instant invention; and FIGURE 5 is an enlarged fragmentary side elevational view similar to that of FIGURE 1 but showing a modified form of actuator for the vacuum spoiler assembly.

Referring now more specifically to the drawings the numeral 10 generally designates an internal combustion engine to which an intake manifold 12 is secured in the conventional manner. The intake manifold 12 has a downdraft carburetor 14 mounted thereon and an adapter plate 16 of the vacuum spoiler of the instant invention is interposed between the base mounting flange 18 of the carburetor 14 and the intake manifold 12.

The vacuum spoiler of the instant invention is generally designated by the reference numeral 20 and further includes an air valve assembly generally referred to by the reference numeral 22 and including an actuator assembly 24. An air conduit assembly 26 comprising a pair of elbows 28 and 30 interconnected by a straight section of tubing 32 and an extension tube 33 is utilized to communicate the interior of the adapter plate 16 with the ambient atmosphere by way of the air valve assembly 22 of which the elbow 28 comprises a part. One free end portion of the elbow 28 is provided with a pair of diametrically opposite and transversely extending slots 34 and 36 and a plate-like gate valve member 38 is slidingly received through the passage defined by the slots 34 and 36 and is provided with an aperture 40 for registry with the interior of the slotted end of the elbow 28.

A mounting bracket 42 is provided and is secured to the intake manifold 12 by means of a suitable fastener 44 and has the air conduit assembly 26 secured thereto in any convenient manner such as by welding 46, see FIGURE 1. In addition, the actuator assembly 24 is secured to one free end portion 48 of the bracket 42 and it may be seen that the actuator assembly 24 comprises a diaphragm motor and that the gate valve member 38 comprises an actuator arm of the diaphragm motor. The diaphragm motor 24 is operatively connected to the interior of the intake manifold 12 by means of a conduit 50 and the operation of the diaphragm motor 24 is such that an increase of vacuum within the manifold 12 will cause the gate valve member 38 to be pulled inwardly of the actuator assembly 24 and the apertured portion of the gate valve member 38 to be disposed within the free end portion of the elbow 28 whereby the air conduit assembly 26 will communicate the interior of the adapter plate 16 with the ambient atmosphere. However, when the vacuum within the intake manifold 12 is below a predetermined level, the diaphragm motor 24 will urge the gate valve member 38 to the position illustrated in FIGURE 3 of the drawings thereby terminating communication between the interior of the adapter plate 16 and the ambient atmosphere.

The extension 33 has its end remote from the elbow 30 snugly received within a bore 52 formed in the adapter plate 16 and opening into the centrally disposed and adjoining apertures 54 formed through the plate 16. It is of course to be understood that the apertures 54 are of a size and shape adapted to fully register with the air passages formed in the carburetor base and the adjacent portions of the manifold 12.

With attention now directed to FIGURE 5 of the drawings there will be seen a modified form of vacuum spoiler assembly generally referred to by the reference numeral 60 which is substantially identical to the vacuum spoiler 20 with the exception that the actuator assembly 62 thereof comprises an electrical solenoid rather than a diaphragm motor. However, the electrical solenoid 62 includes an armature 64 which projects outwardly therefrom and whose free end is substantially identical to the free end of the gate valve member 38. The solenoid 62 is adapted to be electrically actuated by means of a suitable manually operated switch (not shown) or a small source of electrical potential which increases its potential as the operating speed of the internal combustion engine 10 increases.

In operation, the vacuum spoiler is actuated upon an increase of vacuum within the intake manifold 12 beyond a predetermined point and opens the air valve assembly 22 thereby communicating the interior of the adapter plate 16 to the ambient atmosphere. The vacuum spoiler 60 on the other hand is electrically actuated and may be selectively operated at the discretion of the operator of the internal combustion engine 10 or may be automatically actuated by a small source of electrical potential which increases in its potential to a point sufficient to effect actuation of the solenoid 62 upon an increase of the operating speed of the internal combustion engine 10 beyond a predetermined point.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, an internal combustion engine including an intake manifold, a vacuum spoiler for said manifold, said spoiler comprising an air conduit supported exteriorly of said manifold and including inlet and outlet ends, extension conduit means communicating the outlet end of said conduit with the interior of said manifold, the inlet end of said conduit being communicated with the ambient atmosphere, said conduit being of one-piece construction and including a pair of diametrically opposite circumferentially extending slots formed therethrough and spaced circumferentially thereabout, an elongated plate-like valve member of a width less than the outside diameter of said conduit and of a thickness slightly less than the width of said slots, said valve member extending through said slots and being longitudinally reciprocal transversely of said conduit, the opposite side edges of said gate valve member and the portions of said conduit defining the opposite ends of said slots being disposed in slidable guiding engagement with each other and the opposite side faces of said gate valve member being disposed in closely spaced relation with the portions of said conduit defining the opposite sides of said slots whereby the said conduit will have a shearing action on foreign deposits accumulated on said side faces upon longitudinal shifting of said valve member, said valve member including an apertured portion and being selectively longitudinally shiftable between first and second positions with said apertured portion in and out of registry with the interior of said conduit, and force means connected to said valve member and operatively associated with said engine to selectively shift said valve member between said first and second positions in response to predetermined operating conditions of said engine.

References Cited by the Examiner
UNITED STATES PATENTS

| | | | |
|---|---|---|---|
| 1,324,436 | 12/1919 | Singelyn | 123—124 |
| 2,314,141 | 3/1943 | Gutenberg | 137—483 |
| 2,356,134 | 8/1944 | Voit | 251—129 X |
| 2,433,205 | 12/1947 | Decker | 123—124 |
| 2,793,001 | 5/1957 | Gallun | 251—129 |
| 2,913,220 | 11/1959 | Cover | 251—327 X |
| 2,969,800 | 1/1961 | Skirvin | 123—124 X |
| 3,034,492 | 5/1962 | Harmon | 123—124 |

WILLIAM F. O'DEA, *Primary Examiner.*

KARL J. ALBRECHT, ISADOR WEIL, *Examiners.*

H. WEAKLEY, *Assistant Examiner.*